United States Patent [19]
Tomlinson et al.

[11] Patent Number: 5,123,619
[45] Date of Patent: Jun. 23, 1992

[54] ADJUSTABLE CABLE CLAMP

[75] Inventors: Timothy D. Tomlinson, Villa Rica; Willis G. Clark, Douglasville, both of Ga.

[73] Assignee: Teledyne Industries, Inc., Los Angeles, Calif.

[21] Appl. No.: 681,988

[22] Filed: Apr. 8, 1991

[51] Int. Cl.⁵ .............................. F16L 3/08
[52] U.S. Cl. ...................... 248/74.1; 24/16 R; 248/291
[58] Field of Search ........ 248/74.1, 74.4, 74.5, 248/316.1, 313, 291, 284, 294, 61, 554; 24/16 R, 20 LS, 339

[56] References Cited

U.S. PATENT DOCUMENTS

| | | | |
|---|---|---|---|
| 841,914 | 1/1907 | Andrews et al. | 248/61 |
| 1,164,613 | 12/1915 | Jewell | 248/74.1 X |
| 1,197,012 | 9/1916 | Conlin | 248/313 X |
| 2,759,620 | 8/1956 | Pharris | 248/291 X |
| 4,059,872 | 11/1977 | Delesandri | 248/74.1 X |
| 4,144,832 | 3/1979 | Dahl | 248/291 X |
| 4,493,468 | 1/1985 | Roach | 248/74.4 X |

FOREIGN PATENT DOCUMENTS 3026221  2/1982  Fed. Rep. of Germany ..... 248/74.1

Primary Examiner—Ramon O. Ramirez
Attorney, Agent, or Firm—Gifford, Groh, Sprinkle, Patmore and Anderson

[57] ABSTRACT

An adjustable cable clamp assembly for use in positioning ignition leads relative to spark plugs in an aviation engine. A first clamping member is attached to a cable lead, and a second clamping member is attached to an ignition lead assembly. The two clamping members are held at an adjustable pre-selected angle to each other.

17 Claims, 1 Drawing Sheet

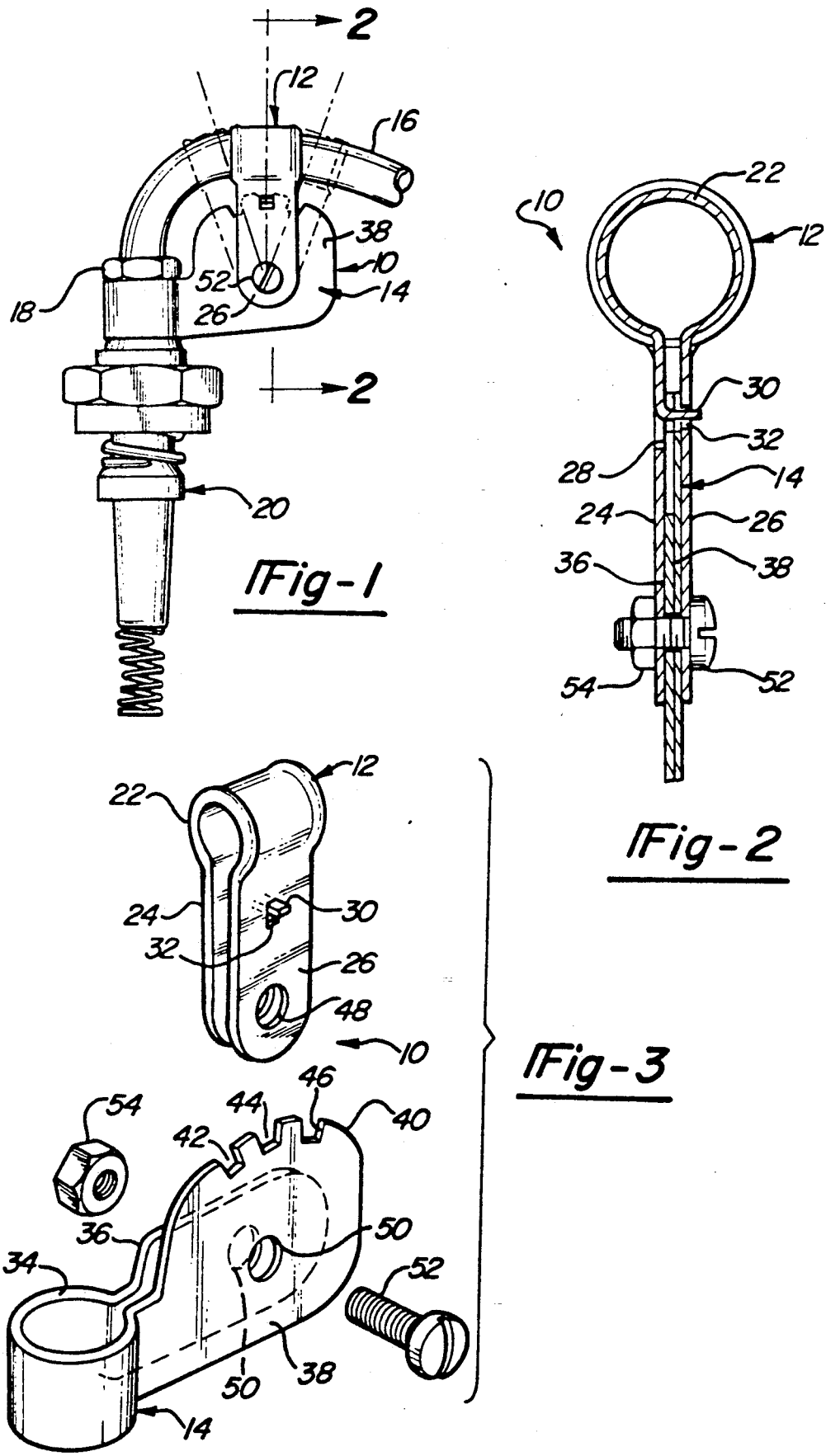

ADJUSTABLE CABLE CLAMP

BACKGROUND OF THE INVENTION

1. Field of the Invention

This invention relates to an adjustable cable clamp. More particularly, this invention relates to an adjustable ignition lead elbow clamp for aircraft engines in which the angle between an ignition lead assembly and the cable lead connected to it can be angularly adjusted for the particular spark plug connection.

2. State of the Prior Art

Automotive engine ignition leads are normally contained in a harness and perhaps a terminating spacer, but they are thereafter individually, randomly tied to the engine block. In an aircraft engine, the specific angle of the ignition lead cable to the ignition lead assembly inserted in and bolted to the individual spark plug is more critical. The most common way of clamping is to employ a different elbow or elbow-clamp assembly for each different lead angle. This requires the use of at least three different elbow or elbow-clamps and may also require a special harness lead assembly configuration. Many of these elbow-angle devices are very expensive without allowing a choice of elbow angle position.

SUMMARY OF THE INVENTION

The present invention provides a simple, inexpensive, light weight, adjustable and easily assembled clamp assembly with a minimum number of pieces. Two clamp members are separately installed, one on the ignition lead cable and the other on the ignition lead retention sleeve of an ignition lead assembly by the user who then determines the most satisfactory angle needed for the particular lead assembly attachment to a particular engine spark plug installation. The selection is an angle elbow of 110°, 90° or 70° which is produced by inserting a tab on one of the clamping members into one of three slots on the other clamping member and tightening them in place by a screw and nut which also holds the clamping members on their respective lead and assembly.

More generally, the adjustable clamp assembly includes a first clamping member having means for attachment to a cable lead and a second clamping member having means for attachment to an ignition lead assembly. Securing means adjustably fastens the first and second leads assemblies together. This securing means includes a releasable fastener, preferably in the form of a screw and nut. The securing means also includes co-operating detents on the clamping members. These detents can take the form of a plurality of spaced slots on a peripheral portion of one of the clamping members and a projecting tab on the other of the clamping members for selectively engaging one of the slots.

More specifically, a preferred embodiment of the adjustable cable clamp assembly of this invention includes a first U-shaped clamping member having a clamping ring bight portion and opposed clamping legs. One of the clamping legs has a lanced portion which forms a tab which projects toward the other of the clamping legs. The other clamping leg has an opening to receive the tab, and each of the legs have aligned apertures adjacent their free ends. A second U-shaped clamping member also has a clamping ring bight portion and opposed clamping legs with one of the legs having an extended planar face with an arcuate perimeter portion. A plurality of spaced inwardly projecting slots are located in this perimeter, and each of the legs of this second clamping member having aligned apertures. A fastener is passed through the apertures holding the first and second clamping members together with the planar surface of the second clamping member held between the legs of the first clamping member positioned by the tab of the first clamping member being located in one of the slots of the second clamping member. Thus an ignition lead cable which passes through the clamping ring of the first clamping member is held positioned relative to an ignition lead assembly having a cylindrical shoulder which passes through the clamping ring of the second clamping member.

Preferably the second member has three equally spaced slots spaced apart approximately 20° to provide an elbow having a turn of 110°, 90° or 70°. Each of the clamping members is preferably formed from aluminum or steel sheet stock and the finished parts are anodized or plated.

BRIEF DESCRIPTION OF THE DRAWING

The advantages and details of the construction will be apparent from the detailed description of the preferred embodiment and the drawing in which the views are as follows:

FIG. 1 is a plan view of the adjustable cable clamp assembly of this invention with a first clamping member secured to an ignition lead cable and a second clamping member secured to the ignition lead retention sleeve of a typical ignition lead assembly with the two clamping members secured together in a preselected one three available positions;

FIG. 2 is a cross sectional view of the adjustable clamp assembly of this invention taken along line 2—2 of FIG. 1; and FIG. 3 is an exploded perspective view showing the manner is which the two U-shaped clamping members are fastened together to complete the adjustable cable clamp assembly of the invention.

DETAILED DESCRIPTION OF THE PREFERRED EMBODIMENT

Referring to the drawing and particularly FIG. 1, the adjustable cable clamp assembly 10 of this invention is shown as including a cable clamping member 12 and an ignition lead assembly clamping member 14.

Cable clamping member 12 is clamped to ignition lead 16, and clamping member 14 is attached to the retention sleeve 18 of the ignition lead assembly 20. Cable clamping member 12 is generally U-shaped having a cable clamping ring 22 with bight and two opposed legs 24 and 26. Leg 24 is lanced at 28 to produce a tab 30 which projects toward and through an opening 32 in the other leg 26.

The clamping member 14 is also generally U-shaped having a sleeve clamping ring 34 at its bight and opposed legs 36 and 38. Leg 38 has an extended planar face with an arcuate perimeter portion 40 containing outwardly opening slots 42, 44 and 46.

Legs 24 and 26 of cable clamping member 12 have registering assembly holes 48, and legs 36 and 38 of clamping member 14 have registering assembly holes 50 for receiving connecting fastener screw 52 retained by nut 54.

In assembling the adjustable cable clamp 12, clamp 10 is installed on ignition cable 16, and clamp 14 is installed on the lead retention sleeve 18 of the ignition lead assembly 20. In the position in which the clamping ring 22 of clamping member 12 firmly holds the cable 16, the legs 24 and 26 are spaced to receive the pressed together legs 36 and 38 of clamping member 14. Clamping ring 34 is firmly seated on the retention sleeve 18 when clamping legs 36 and 38 are in contact with each other. As the cable clamping member 12 is being assembled to the sleeve clamping member 14 the detent tab 30 is aligned with one of detent receiving slots 42, 44 or 46 to align the cable 16 at 70°, 90°, or 110° to the axis of the ignition lead assembly. This 20° spread between the detent positions provides the requisite flexibility to allow the user to align the lead relative to the spark plug being connected. Once the tab 30 has been located in the selected slot, and the assembling holes 48 and 50 and the clamping member legs have been aligned, the screw 52 is inserted and retained by tightening nut 54. In this tightened position, the clamping member 12 is retained in its pre-selected position relative to clamping member 14, and the clamping rings 22 and 34 firmly hold the clamp assembly to the cable and the ignition assembly.

The embodiments of the invention in which an exclusive property or privilege is claimed are defined as follows:

1. An adjustable cable clamp assembly comprising:
   a first clamping member having means for attachment to a cable lead;
   a second clamping member having means for attachment to an ignition lead assembly; and
   securing means for adjustably fastening said first and second lead assemblies to each other; one of said first and second clamping members has a plurality of spaced slots and the other of said first and second clamping members has a projecting tab engaging in a selected one of said plurality of spaced slots.

2. The adjustable cable clamp assembly according to claim 1 wherein said securing means comprises a releaseable fastener.

3. The adjustable cable clamp assembly of claim 2 wherein said releaseable fastener includes a screw and nut.

4. The adjustable cable clamp assembly according to claim 1 wherein said securing means includes cooperating detent means on said first and second clamping members.

5. The adjustable cable clamp assembly according to claim 4 wherein said securing means includes means for pivotally adjusting said first and second clamping members relative to each other to adjust the angle between said cable lead and said ignition lead assembly.

6. The cable clamp assembly according to claim 1 wherein said securing means includes a releasable fastener which serves as a pivot axis for adjusting the angle between said first and second clamping members.

7. The adjustable cable clamp assembly according to claim 6 wherein said slots are located on a peripheral portion of one of said first and second clamping members disposed at equal angular displacements with respect to said pivot axis.

8. The adjustable cable clamp assembly according to claim 6 wherein said first and second clamping members both have U-shaped configurations with clamping ring bight portions for attachment to said cable lead and ignition lead assemblies respectively and pairs of opposed clamping legs which are secured together in a locked position by said releaseable fastener.

9. An adjustable cable clamp assembly comprising:
   a first U-shaped clamping member having a clamping ring bight portion and opposed clamping legs, one of said legs having a lanced portion forming a tab projecting toward the other of said legs, the other of said legs having an opening to receive said tab, and said legs having aligned apertures adjacent their free ends;
   a second U-shaped clamping member having a clamping ring bight portion and opposed clamping legs, one of said legs having an extended planar face with an arcuate perimeter portion having a plurality of spaced inwardly projecting slots, and said legs having aligned apertures; and
   a fastener passing through said apertures holding said first and second clamping members together with the planar surface of said second clamping member held between the legs of said first clamping member positioned by the tab of said first clamping member being located in one of said slots in said second clamping member;
   whereby an ignition lead cable passing through the clamping ring of said first clamping member is held positioned relative to an ignition lead assembly having a cylindrical shoulder passing through the clamping ring of said second clamping member.

10. The clamp assembly according to claim 9 wherein said second clamping member has three equally spaced slots.

11. The clamp assembly according to claim 10 wherein said arcuate perimeter has a center of curvature at the aligned apertures of said second clamping member, with said slots being spaced approximately 20° apart.

12. The clamping assembly according to claim 11 wherein a center one of said three slots is centered on a line perpendicular to the legs of said second clamping member.

13. The clamp assembly according to claim 9 wherein both of the legs of said second clamping member are held between the legs of said first clamping member.

14. The clamping assembly according to claim 9 wherein said fastener includes a screw and nut.

15. The clamping assembly according to claim 9 wherein first and second clamping members are formed from aluminum or steel sheet stock.

16. The clamping assembly according to claim 15 wherein said first and second clamping members are anodized or plated.

17. An adjustable cable clamp assembly comprising:
   a first clamping member extending in a plane along an X-axis having means for attachment to a cable lead;
   a second clamping member extending in a plane along a Y-axis having means for attachment to an ignition lead assembly; and
   securing means for adjustably fastening said first and second lead assemblies to each other; said securing means comprising means for pivotally adjusting said first clamping member relative to said second clamping member along a Z-axis.

* * * * *